June 18, 1929.  E. P. BULLARD, JR., ET AL  1,717,833
CLUTCH
Filed May 22, 1926  2 Sheets-Sheet 1
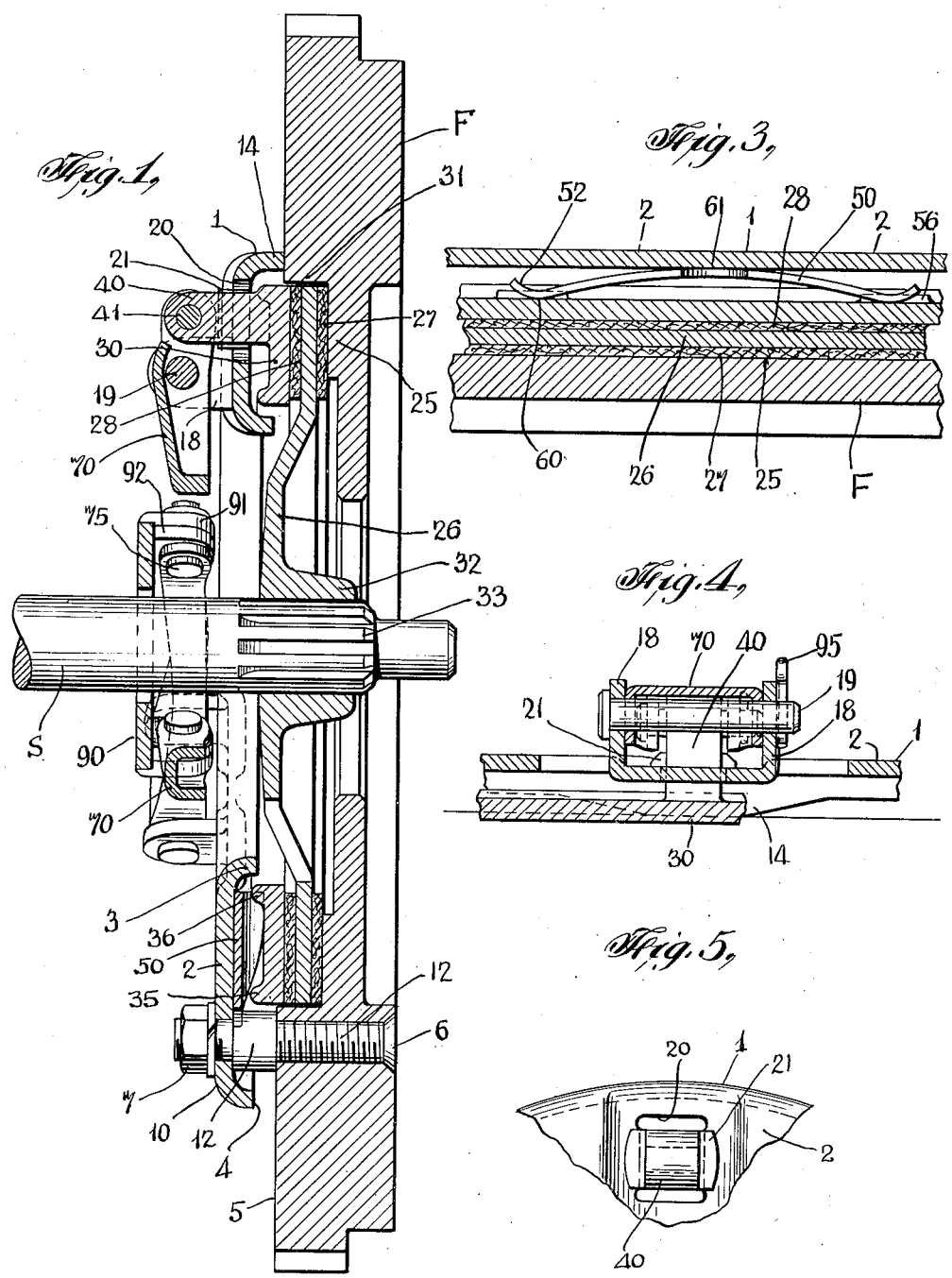
INVENTOR
Edward P. Bullard, Jr.
George F. Kolb
BY
Dempster M. Smith
ATTORNEY

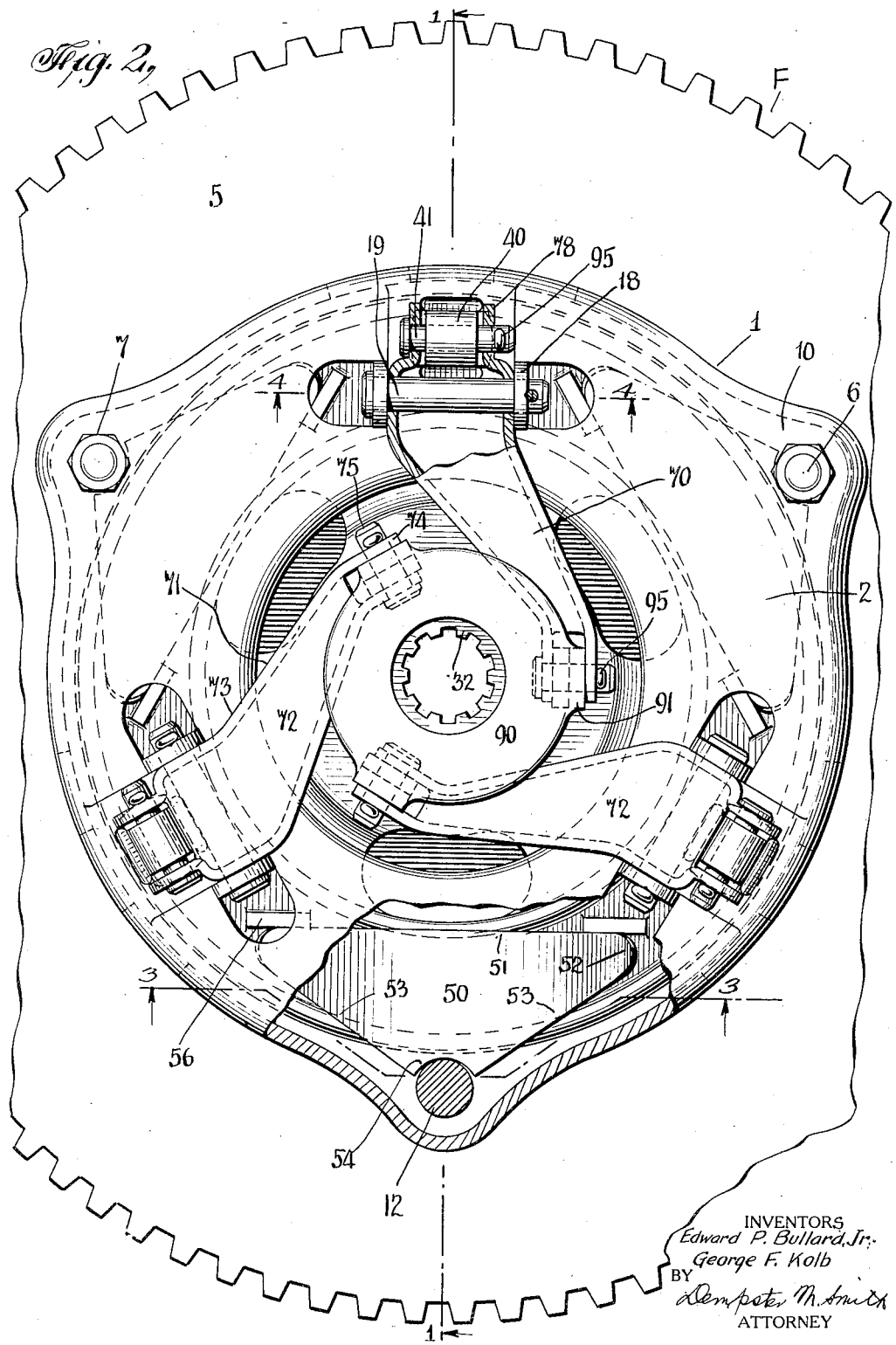

Patented June 18, 1929.

1,717,833

UNITED STATES PATENT OFFICE.

EDWARD P. BULLARD, JR., OF STRATFORD, AND GEORGE F. KOLB, OF BRIDGEPORT, CONNECTICUT, ASSIGNORS TO THE BULLARD MACHINE TOOL CO., OF BRIDGEPORT, CONNECTICUT, A CORPORATION OF CONNECTICUT.

CLUTCH.

Application filed May 22, 1926. Serial No. 110,946.

This invention relates to clutches of a type generally similar to that disclosed in our previous application, Ser. No. 27,527, filed May 2nd, 1925, which has matured into Patent No. 1,601,235, with various modifications and improvements.

The general object is to provide a clutch in which plate springs of novel and improved design are used as the friction-pressure means, in connection with other features or arrangements of parts coordinated with springs of this character.

Another object is to provide a clutch of very simple, strong, and durable design, which may be produced at low cost, and which also has the necessary qualities for satisfactory service in motor vehicles and for analogous purposes, such as high torque and slippage capacity, and high leverage-ratio for easy release.

Another object is to provide in connection with the other objects and characteristics mentioned, a design in which many of the parts may be made of pressed metal, for the sake of economy in production cost.

Another object is to provide a clutch structure which is substantially unitary or self-contained and may therefore be conveniently assembled and shipped, and easily placed in operative position by motor vehicle manufacturers or assemblers.

The characteristics and advantages of the invention are further sufficiently explained in connection with the following detail description of the accompanying drawing, which shows one representative embodiment of the invention. After considering this example, skilled persons will understand that many variations may be made, and I contemplate the employment of any structures that are properly within the scope of the appended claims.

In the drawings:

Fig. 1 is a section in the axial plane 1—1 of Fig. 2, of a clutch embodying the invention in one form, applied to one standard type of vehicle-engine fly wheel and to a typical clutch—or transmission—shaft.

Fig. 2 is a rear elevation (with respect to the usual location in the vehicle), with some parts broken away and in section.

Fig. 3 is a section at 3—3, Fig. 2.

Fig. 4 is a section at 4—4, Fig. 2.

Fig. 5 is a fragmentary detail of the abutment plate or ring and one of the pressure plate lugs.

The clutch proper includes all the parts shown in Figs. 1 and 2 except the fly wheel F and shaft S with which the clutch cooperates. The fly wheel shown is one typical or standard form and the clutch may, with or without modification, be adapted to other forms of fly wheels.

A member 1 conveniently identified as an abutment plate or ring is preferably so designed that, as shown, it may be formed by pressing operations from sheet metal of substantial thickness. It is of generally dished, annular form, including a flat annular plate or web 2 with shallow inner and outer peripheral flanges 3 and 4 respectively. This plate is secured to the rear face 5 of the ball of the fly wheel by stud bolts 6 and nuts 7 thereon. To avoid increasing the general diameter of the plate, it is preferably provided with lobes 10 bored to receive outer portions of the bolts. The bolts are provided with integral or separate spacers 12 to properly space the abutment plate from the wheel, and the nuts 7 hold the plate firmly against the spacers. At points intermediate the bolts the inner flange 3 is extended to form feet 14 resting against fly wheel face 5 to directly transfer to the wheel the pressure applied to the plate in releasing the clutch, and in this way to prevent any tendency to distort the abutment plate during the releasing action.

In the present example the clutch is designed for the use of three plate springs (later described), and other parts, such as the mounting bolts, releasing levers and their appurtenances, are therefore provided in triplicate. At points intermediate the bolts and bolt lobes 10, lugs 18 are punched out of the integral metal of the plate web 2 and bent outward at right angles, and these lugs are bored to receive the lever-fulcrum pins 19. Also on radial lines centered between the lugs 18 of the respective lug-pairs, apertures 20 are punched in the plate web in such a way as to provide integral bearing lugs 21, which have a close sliding fit on pressure plate lugs later described, and provide adequate bearings between these lugs and the abutment plate, to practically eliminate wear.

The fly wheel is formed with a friction face 25, and a driven clutch spider or plate 26 is arranged so that its peripheral area confronts the fly wheel surface. Usually a friction ring 27 of suitable material, such as an asbestos composition, is placed between the driven plate and the fly wheel, and another similar ring 28 between the driven plate and the pressure plate 30. In some cases these friction discs or rings may be free and prevented from displacement by the fly wheel shoulder 31; otherwise, if desired, they may be connected to the driven plate. The driven plate or spider has a hub 32 internally splined to co-operate with any usual spline formation 33 of the clutch shaft S.

The pressure plate 30 may in some cases be formed of pressed sheet metal, but in the present example is a casting including the annular portion 30 which usually has at its rear inner and outer peripheries, shallow flanges 35 and 36 respectively, and also has at intervals corresponding to the abutment apertures 20, releasing lugs 40, the side faces of which are, as above stated, designed to have a close sliding fit between bearing lugs 21. The rearward ends of the releasing lugs, projecting back of the abutment plate, are bored to receive lever connecting pins 41.

Plate springs 50 are symmetrically interspaced with the releasing lugs. Each spring is, in a preferred form, of substantially triangular outline, having a substantially straight inner edge 51, rounded ends 52, and substantially straight angularly arranged outer edges 53. At a point which would be the triangle-apex formed by the meeting of edges 53, a substantially arcuate notch 54 is formed to partly embrace the adjacent bolt spacer 12, and so to form one point of connection between the spring and the clutch structure without limiting the spring flexure. Substantially free connection points between the spring and the pressure plate are also provided, consisting in lugs 56 formed on the plate and engaging the inner straight edge 51 of the spring near the ends thereof, this connection also permitting free sliding of the spring ends in relation to the plate as the spring is extended and retracted during clutch release and reengagement.

Preferably, the spring is bowed throughout the greater part of its length, as sufficiently indicated in Fig. 3, and the ends 52 are recurved slightly to provide rounded areas or faces 60 to bear upon the pressure plate, while the central part of the spring has a rounded area of contact at 61 against the abutment web 2.

These springs may be accurately and economically made of pressed sheet metal, and the described substantially triangular outline provides for substantially uniform deflection as well as for compact and symmetrical arrangement in relation to other parts of the clutch structure, as shown in Fig. 2. For a given pressure value and standard of accuracy, these springs may be very cheaply produced, as compared with helical springs usually employed in motor vehicle clutches, and the plate springs have many other advantages, as fully pointed out in our pending application previously identified.

The releasing levers 70, three in number in the present example, are preferably, as shown, formed from sheet metal by pressing operations. Preferably, also, the levers, or at least their long arms, are arranged diagonally, that is, on non-radial lines, to co-operate with a shifter plate 90, so that while the short arm of the lever (from the fulcrum to the working point) is preferably radial to the shaft axis, the connection of the power arm to the shifter 90 is at a point at a right angle to the radius mentioned. In this way the effective length of the power arm is materially increased, with corresponding increase of the leverage effect, so that with a very substantial total spring pressure, the clutch may be easily released by persons of ordinary strength.

The long portion or power arm 71 of each lever is usually of dished form or channel cross section, including a flat central web 72 and edge flanges 73. At the inward end the web is cut away and the flanges are formed into ears 74 bored to receive a pivot stud 75 passing through a pivot hole in a lug 91, formed at the periphery of the releasing plate. This plate may also be made of pressed sheet metal and the ears may be integral, and when desired may be thickened to provide proper bearing surfaces by applying spot-welding separate sheet metal pieces 92, as best shown in Fig. 1.

At the fulcrum points the lever edge flanges 73 are bored transversely to accommodate the fulcrum pins 19 above referred to, which also pass through abutment lugs 18 to provide a fulcrum connection of the levers to the abutment plate. The side flanges are extended beyond this point and formed into eyes 78, which are bored to receive pins 41 which also pass through the pressure plate lugs 40 as previously mentioned, to provide for connection of the levers to the pressure plate to retract the latter against the pressure of springs 50.

In the present design the pressure plate and levers and other parts are arranged for clutch release by movement of the releasing plate 90 toward the clutch structure; but opposite releasing movement can be provided for by different arrangement of parts.

The various fulcrum and pivot pins or studs may be held in place by any simple means, such as cotter pins 95.

In addition to other advantages, the described spring arrangement provides, with a relatively small number of springs, a much greater number of pressure points upon the pressure plate, to adequately distribute and equalize the spring pressure applied to that plate and so to the other friction members or surfaces, and also to minimize the tendency to distort the pressure or other plates, and in this way to avoid unequal wear and other disadvantages well understood by skilled persons.

We claim:—

1. A clutch for automotive vehicles and other purposes, comprising a driven member adapted for connection to a clutch shaft, an abutment member adapted for connection to a driver such as a fly wheel, a pressure plate, a plurality of releasing levers co-operating with the abutment and pressure plate, and a plurality of plate springs uniformly spaced and located between the abutment member and pressure plate, each spring being of approximately triangular outline, each spring having substantially at a substantially central point of one side means for free connection with a driving element.

2. A clutch for automotive vehicles and other purposes, comprising a driven member adapted for connection to a clutch shaft, an abutment member adapted for connection to a driver such as a fly wheel, a pressure plate, a plurality of releasing levers co-operating with the abutment and pressure plate, and a plurality of plate springs uniformly spaced and located between the abutment member and pressure plate, each spring being of approximately triangular outline, the pressure plate having lugs slidably engaged with the springs near the ends thereof.

3. A clutch for automotive vehicles and other purposes, comprising a driven member adapted for connection to a clutch shaft, an abutment member adapted for connection to a driver such as a fly wheel, a pressure plate, a plurality of releasing levers co-operating with the abutment and pressure plate, and a plurality of plate springs uniformly spaced and located between the abutment member and pressure plate, each spring being of approximately triangular outline, each spring having substantially at a substantially central point of one side means for free connection with a driving element, the pressure plate having lugs slidably engaged with the springs near the ends thereof.

4. A clutch for automotive vehicles and other purposes, comprising a driven member adapted for connection to a clutch shaft, an abutment member adapted for connection to a driver such as a fly wheel, a pressure plate, a plurality of releasing levers co-operating with the abutment member and pressure plate, and a plurality of plate springs uniformly spaced and located between the abutment member and pressure plate, each spring being bowed in longitudinal section and being of approximately triangular plan outline, the spring having substantially at its outward center means for free connection with a driving element.

5. A clutch for automotive vehicles and other purposes, comprising a driven spider adapted for connection to a clutch shaft, a pressure plate having regularly-spaced releasing lugs projecting rearwardly therefrom, an abutment plate apertured for sliding accommodation of said pressure plate lugs, the abutment plate also having spaced lug to provide lever fulcrums, releasing levers fulcrumed between said abutment lugs and also pivotally connected to the pressure plate lugs, a releasing plate pivotally connected to the inner ends of the levers, the abutment plate having holes regularly interspaced with the levers and pressure plate lugs to provide for bolt connection to a fly wheel, and plate springs regularly interspaced with the levers between the pressure plate and the abutment plate.

6. A clutch for automotive vehicles and other purposes, comprising a driven spider adapted for connection to a clutch shaft, a pressure plate having regularly-spaced releasing lugs projecting rearwardly therefrom, an abutment plate apertured for sliding accommodation of said pressure plate lugs, the abutment plate also having spaced lugs to provide lever fulcrums, releasing levers fulcrumed between said abutment lugs and also pivotally connected to the pressure plate lugs, the long arms of the levers inward from the fulcrums being non-radially disposed to provide increased leverage, a releasing plate pivotally connected to the inner ends of the levers, the abutment plate having holes regularly interspaced with the levers and pressure plate lugs to provide for bolt connection to a fly wheel, and plate springs regularly interspaced with the levers between the pressure plate and the abutment plate.

7. A clutch for automotive vehicles and other purposes, comprising a driven spider adapted for connection to a clutch shaft, a pressure plate having regularly-spaced releasing lugs projecting rearwardly therefrom, an abutment plate apertured for sliding accommodation of said pressure plate lugs, the abutment plate also having spaced lugs to provide lever fulcrums, releasing levers fulcrumed between said abutment lugs and also pivotally connected to the pressure plate lugs, a releasing plate pivotally connected to the inner ends of the levers, the abutment plate having holes regularly interspaced with the levers and pressure plate lugs to provide for bolt connection to a fly wheel, plate springs regularly interspaced with the levers between the pressure plate and the abutment plate, each spring being of pressed sheet metal, bowed in longitudinal section, and having reversely curved ends in the same section plane, the plan outline of the spring being substantially triangular.

8. A clutch for automotive vehicles and other purposes, comprising a driven spider adapted for connection to a clutch shaft, a pressure plate having regularly-spaced releasing lugs projecting rearwardly therefrom, an abutment plate apertured for sliding accommodation of said pressure plate lugs, the abutment plate also having spaced lugs to provide lever fulcrums, releasing levers fulcrumed between said abutment lugs and also pivotally connected to the pressure plate lugs, a releasing plate pivotally connected to the inner ends of the levers, the abutment plate having holes regularly interspaced with the levers and pressure plate lugs to provide for bolt connection to a fly wheel, plate springs regularly interspaced with the levers between the pressure plate and the abutment plate, each spring being of pressed sheet metal, bowed in longitudinal section, and having reversely curved ends in the same section plane, the plan outline of the spring being substantially triangular, the spring having at a substantially central point on one side, means connecting it with a driving element.

9. A clutch for automotive vehicles and other purposes, comprising a driven spider adapted for connection to a clutch shaft, a pressure plate having regularly-spaced releasing lugs projecting rewardly therefrom, an abutment plate of pressed sheet metal apertured for sliding accommodation of said pressure plate lugs, the abutment plate also having spaced lugs to provide lever fulcrums, releasing levers fulcrumed between said abutment lugs and also pivotally connected to the pressure plate lugs, a releasing plate pivotally connected to the inner ends of the levers, the abutment plate having holes regularly interspaced with the levers and pressure plate lugs to provide for bolt connection to a fly wheel, plate springs regularly interspaced with the levers between the pressure plate and the abutment plate, each spring being of pressed sheet metal, bowed in longitudinal section, and having reversely curved ends in the same section plane, the plan outline of the spring being substantially triangular, the pressure plate having lugs providing slidable connections with the spring at its inner edge and near its ends.

10. A clutch for automotive vehicles and other purposes, comprising a driven spider adapted for connection to a clutch shaft, a pressure plate having regularly-spaced releasing lugs projecting rearwardly therefrom, an abutment plate of pressed sheet metal apertured for sliding accommodation of said pressure plate lugs, the abutment plate also having spaced lugs to provide lever fulcrums, releasing levers fulcrumed between said abutment lugs and also pivotally connected to the pressure plate lugs, a releasing plate pivotally connected to the inner ends of the levers, the abutment plate having holes regularly interspaced with the levers and pressure plate lugs to provide for bolt connection to a fly wheel, plate springs regularly interspaced with the levers between the pressure plate and the abutment plate, each spring being of pressed sheet metal, bowed in longitudinal section, and having reversely curved ends in the same section plane, the plan outline of the spring being substantially triangular, the spring having substantially at its outer center a notch to co-operate with a bolt securing the abutment plate to a fly wheel, the pressure plate having lugs providing slidable connection with the spring at its inner edge and near its ends.

11. In a clutch, a driving member having a friction surface, a driven member having a friction surface, an abutment ring secured to and spaced from the driving member, a pressure ring between the driven member and the abutment ring, a concentric operating collar, levers fulcrumed on said abutment ring on its side remote from the driving member and pivoted to said collar and pressure ring, resilient clutch engaging means acting to move said pressure ring and driven member into engagement with said driving member.

12. The invention defined in claim 11, said resilient clutch engaging means consisting of a flat spring of triangular conformation interposed between the pressure ring and the abutment ring.

13. The invention defined by claim 11, said resilient clutch engaging means consisting of a flat spring located between said abutment ring and said pressure ring, said spring being of triangular conformation and positioned by the fastening means for said abutment ring, the release of said clutch against the tension of said spring being accomplished by an axial movement of said collar.

14. In a clutch, a fly wheel, a driven member movable into frictional engagement with said fly wheel, a pressure plate, an abutment plate secured at a plurality of spaced positions to said fly wheel, the periphery of said abutment plate lying closely adjacent said fly wheel at points mid-way between said points of attachment, springs between said abutment plate and the pressure plate, the abutment plate being of such strength and dimensions as to resist the spring action when the clutch is engaged, the tendency of the plate to be distorted under declutching action being transmitted to the fly wheel at the points of engagement between the points of abutment and the fly wheel.

Signed at Bridgeport, in the county of Fairfield and State of Connecticut, this 16th day of April, A. D. 1926.

EDWARD P. BULLARD, Jr.
GEORGE F. KOLB.